July 4, 1939. A. SWANSON 2,164,597
AUTOMATIC LENGTH-CONTROLLING APPARATUS
Filed Feb. 24, 1938
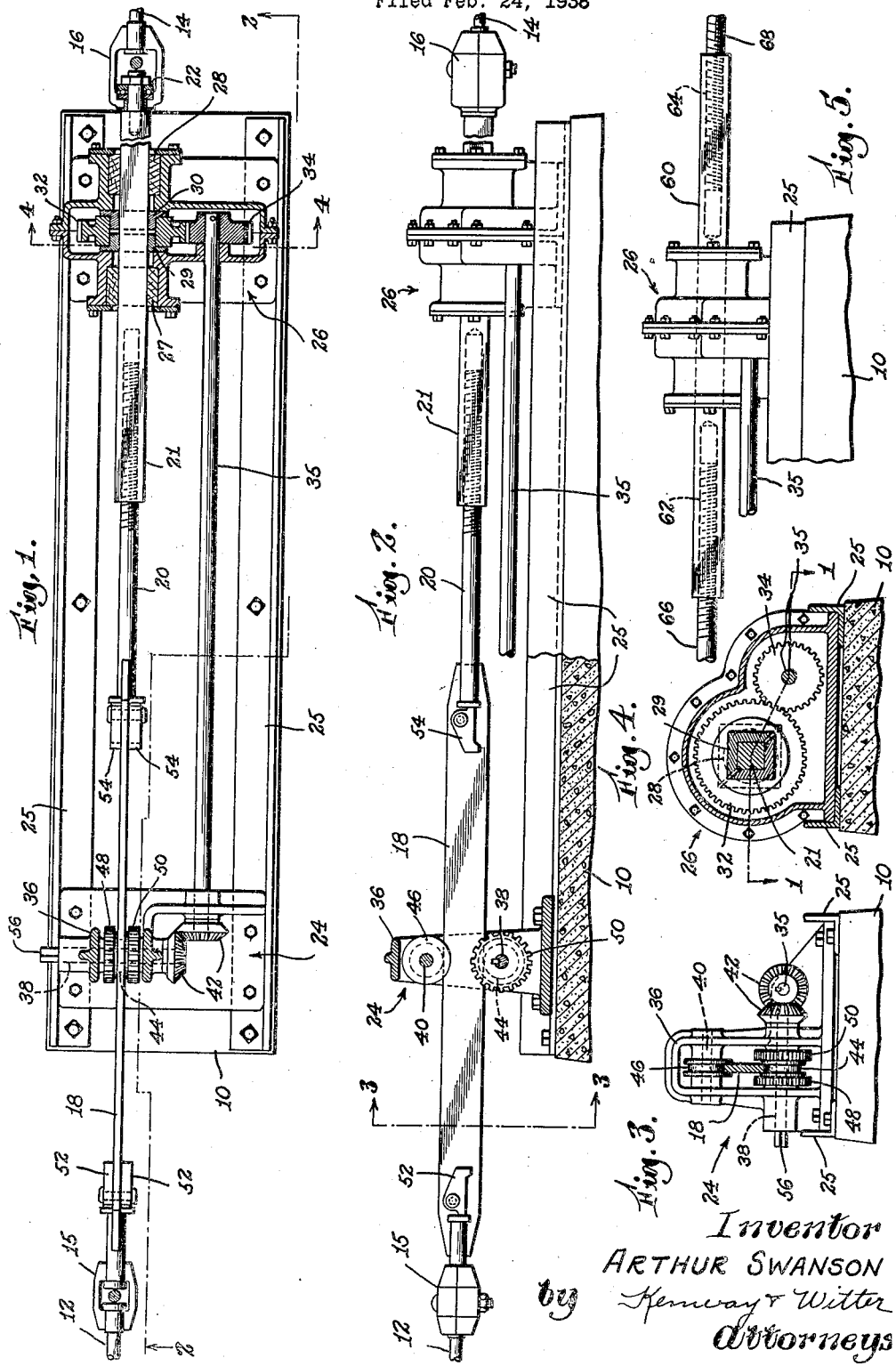
Inventor
ARTHUR SWANSON Patented July 4, 1939

2,164,597

UNITED STATES PATENT OFFICE 2,164,597

AUTOMATIC LENGTH-CONTROLLING APPARATUS

Arthur Swanson, Pampa, Tex., assignor to Cabot Shops, Inc., Boston, Mass., a corporation of Massachusetts Application February 24, 1938, Serial No. 192,324

4 Claims. (Cl. 74—586)

This invention relates to automatic length controlling apparatus and more particularly to such an apparatus in combination with a reciprocatory power line. Oil wells are commonly pumped in groups by a single power unit located centrally of the group and connected to the pumps at the wells by steel rods radiating from the power unit. The power unit reciprocates these rods which thereupon reciprocate the pump plungers, an underpull jack being located at each well to change the horizontal reciprocation of the rod into a vertical reciprocation of the pump plunger in its working barrel. The rods are in some cases as long as 3000 feet and the changes in atmospheric temperature to which they are subjected cause considerable length variation in the rods whereby causing overstroke and understroke of the pumps, as will be apparent. Such variation in the stroke tends to change the position of the plungers in the pumps, places undue strain on all working parts, and causes excessive wear, breakages and higher maintenance costs. Manually operated turnbuckles have been provided in the lines to compensate for such variation but the additional work and attention required to keep these adjusted have rendered such manual devices ineffective. The primary object of my invention is to produce a novel length controlling apparatus which will automatically maintain the rods or rod lines at uniform length under all variations in temperature encountered in working conditions.

My invention contemplates an adjustable connection in each line, preferably of a screw threaded nature, and means so associating each connection with its line that any lengthening or shortening of the line will operate automatically on the connection to compensate for such changes in the line, thereby automatically keeping the line of uniform length and the effective pumping stroke thereof uniform.

These and other features of the invention will be best understood and appreciated from the following description of preferred embodiments thereof, selected for purposes of illustration and shown in the accompanying drawing, in which Fig. 1 is an plan view partly in section, of a length controlling apparatus embodying my invention, Fig. 2 is a side elevation thereof partly broken away, Fig. 3 is a sectional view taken on line 3—3 of Fig. 2, Fig. 4 is a sectional view taken on line 4—4 of Fig. 1, and Fig. 5 is a fragmentary side elevation of a modification.

Referring to Figs. 1-4 of the drawing, 10 indicates a block of concrete or the like on which the length controlling apparatus is supported, this apparatus preferably being located near the well end of the rod line. The section 12 of the line is connected to the pump and the section 14 is connected to the power unit, these two sections being joined together by a portion of the length controlling apparatus and including swivel connections 15 and 16. This connection portion of the apparatus includes a flat bar 18 connected to the swivel 15 and non-rotatably connected to a threaded rod 20. A long nut 21 of square external configuration is threaded to the rod and connected to the swivel 16 through a ball thrust bearing 22.

Mounted on opposite ends of the block 10 and respectively associated with the bar 18 and the nut 21 are units 24 and 26, these units preferably being secured in proper spaced relation to a steel frame or base 25 in turn mounted on the block 10. The unit 26 comprises a housing having bushings 27 and 28 therein fitted to receive and support the nut 21, the bushings being round outside and square inside. Mounted on the nut between the bushings 27 and 28 are two bushings 29 and 30, square inside and outside, on which is carried a gear 32, the latter bushings being held from longitudinal movement by engagement with the housing. The nut is free to reciprocate through the bushings but cannot rotate independently of the gear. A smaller gear 34 in mesh with the gear 32 is fixed to one end of a shaft 35, which extends into the unit 24 and in parallel relation to the rod 20.

The unit 24 embodies a U-shaped housing 36 carrying two transverse shafts 38 and 40. The lower shaft 38 is connected to the shaft 35 by bevel gears 42. Flanged rollers 44 and 46 on the shafts 38 and 40 non-rotatably support the bar 18 therebetween and two ratchet wheels 48 and 50 are fixed to the shaft 38 at opposite sides of the roller 44. Carried by the bar 18 at opposite sides of the housing 36 are two pairs of pawls 52 and 54 arranged to cooperate with and rotate the ratchet wheels 48 and 50 to effect automatic length adjustment of the rod. The rod length may be manually adjusted by rotating the shaft 38 from its squared end 56.

In Figs. 1 and 2 the device is illustrated in the midstroke or central position in which position the pawls 52 and 54 are approximately equally spaced from the ratchet wheels 48 and 50. The relative arrangement of the pawls and ratchet wheels is furthermore such that in the normal stroking of the line each pawl approaches the ratchet wheels short of a position of engagement therewith. Should the relatively long portion 14 of the line contract, due to a drop in temperature or otherwise, the bar 18 will stroke further to the right and the pawls 52 will be brought into engagement with the ratchet wheels. Such engagement will rotate the ratchet wheels in a clockwise direction and, through the connection including the shaft 35, unscrew the nut 21 from the rod 20 whereby lengthening the line. Likewise, should the portion 14 of the line expand due to a rise in temperature or otherwise, the bar 18 will stroke further to the left and the pawls 54 will be brought into engagement with the ratchet wheels. Such engagement will rotate the ratchet wheels in a counter-clockwise direction and, through the connection including the shaft 35, screw the nut 21 further onto the rod 20 whereby shortening the line. It will furthermore be understood that such adjustments will take place automatically until the mid-stroke position is reached, wherein the pawls fail to engage the ratchet wheels.

In some cases where, for example, the metal line is of extreme length and/or it is desirable to make greater or more rapid adjustments, a double threaded nut 60, as illustrated in Fig. 5, may be employed. In such case the nut 60 is oppositely threaded at its two ends 62 and 64 to portions 66 and 68 of the line whereby rotation of the nut in one direction or the other respectively lengthens and shortens the line at both ends of the nut. This construction is otherwise substantially as illustrated and described in relation to Figs. 1-4.

The nuts 21 or 60 each preferably comprises a long hollow square bar having a machined nut of square external configuration welded to one or both ends thereof. The pawls 52 and 54 may also be so attached to the bar 18 that they may be conveniently adjusted along the bar to correspond to the stroke of the rod. I may also enclose the square nut in an oil sealed chamber, partially filled with oil, whereby eliminating friction and excessive wear due to dust storms and the elements, and in some cases I may so enclose the entire operating unit.

It will now be apparent that I have produced a relatively simple device which will automatically maintain the line at uniform length and the pump at uniform stroke and thereby eliminate the trouble, expense and objections heretofore caused by the length variations due primarily to temperature changes. The manual adjustment secured by placing a crank on the squared end 56 of the shaft 38 is useful when adjusting the relation of the bar 18, its pawls and the ratchet wheels, and this manual adjustment is also used to lengthen out the line to permit splicing the ends in case of line breakage.

Having thus described my invention, what I claim as new and desire to secure by Letters Patent of the United States is:

1. In a device of the class described, a reciprocatory line including a rod threaded into an elongated nut, a base, means on the base engaging the exterior of the nut to rotate the same while permitting longitudinal movement thereof, rotary means on the base associated with the line, a mechanical driving connection between the rotary means and the nut-rotating means, and pawls carried by the line and operative through said rotary means to rotate the nut-rotating means together with the nut when the line exceeds its normal reciprocatory stroke.

2. In a device of the class described, a reciprocatory rod line including two units in screw-threaded engagement, a base, rotary means on the base so associated with one of said units as to permit relative movement longitudinally of the line between said means and said unit but not relative rotary movement, mechanism having a rotatable element associated with and arranged to be rotated in one direction or the other by engagement of the rod line therewith when the line exceeds its normal stroke, and a mechanical driving connection between said rotatable element and said rotary means for rotating the latter with said one unit to adjust the length of the rod line.

3. In a device of the class described, a reciprocatory line including two units in screw-threaded engagement, a base, means on the base so associated with one of said units as to permit relative longitudinal movement between said means and said one unit but not relative rotary movement, rotary mechanism associated with the line, pawls carried by the line and operative on said rotary mechanism to rotate the same when the line exceeds its normal stroke, and a mechanical driving connection between said rotary mechanism and said means for rotating said means and said one unit.

4. In a device of the class described, a reciprocatory rod including a rotatable connecting unit located therein and constructed and arranged by rotation to vary the length of the rod, a rotary member, two pawls carried by the rod and located respectively at opposite sides of the member and arranged to operate on the member to rotate the same when variation in the length of the rod causes abnormal longitudinal displacement of the rod relative to said member, means for preventing rotation of that portion of the rod which carries the pawls, and a mechanical driving connection between said member and said rotatable connecting unit for rotating the unit from the member.

ARTHUR SWANSON.